United States Patent
Bruhn et al.

(10) Patent No.: US 10,876,623 B2
(45) Date of Patent: Dec. 29, 2020

(54) COMPENSATING ARRANGEMENT FOR COMPENSATING AXIAL PLAY, AND TRANSMISSION UNIT

(71) Applicant: NIDEC MOTORS & ACTUATORS (GERMANY) GmbH, Bietigheim-Bissingen (DE)

(72) Inventors: Rainer Bruhn, Ingersheim (DE); Jian Yang, Walheim (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 0 days.

(21) Appl. No.: 16/656,988

(22) Filed: Oct. 18, 2019

(65) Prior Publication Data
US 2020/0124164 A1 Apr. 23, 2020

(30) Foreign Application Priority Data
Oct. 19, 2018 (DE) .................. 10 2018 126 054

(51) Int. Cl.
*F16H 57/12* (2006.01)
*F16H 57/025* (2012.01)
(Continued)

(52) U.S. Cl.
CPC ........... *F16H 57/12* (2013.01); *F16H 57/025* (2013.01); *F16H 57/022* (2013.01);
(Continued)

(58) Field of Classification Search
CPC ...... F16H 57/12; F16H 57/022; F16H 57/025; F16H 2057/0221; F16H 2057/127;
(Continued)

(56) References Cited

U.S. PATENT DOCUMENTS 3,549,218 A * 12/1970 Cagnon .................. F16C 17/08
384/425
3,848,477 A 11/1974 Giandinoto
(Continued)

FOREIGN PATENT DOCUMENTS

DE 2312395 A 9/1973
DE 7900053 U1 4/1979
(Continued)

OTHER PUBLICATIONS

Define cross-fluting, Google Search, Jul. 24, 2020 (Year: 2020).*
(Continued)

*Primary Examiner* — Vinh Luong
(74) *Attorney, Agent, or Firm* — Lucas & Mercanti, LLP; Klaus P. Stoffel

(57) ABSTRACT

A compensating arrangement for compensating axial play for a transmission housing unit, having a housing base body and a rotatable shaft, a first guide surface transversely to the axial direction and a second guide surface obliquely to the axial direction, wherein the shaft is supported between the guide surfaces with the interposition of the compensating arrangement, is configured in the shape of a wedge and is displaceable along the second guide surface in a feed direction transversely to the axial direction in order to compensate axial play of the shaft, wherein the transmission housing unit contains a pre-stressed spring element for the compensating arrangement in the feed direction, wherein the compensating arrangement is configured to increase the frictional force at least in the direction opposite the feed direction.

14 Claims, 4 Drawing Sheets

(51) Int. Cl.
*F16H 57/022* (2012.01)
*F16H 57/021* (2012.01)

(52) U.S. Cl.
CPC .............. *F16H 2057/0213* (2013.01); *F16H 2057/0221* (2013.01); *F16H 2057/127* (2013.01)

(58) Field of Classification Search
CPC ..... F16H 2057/0213; F16H 2057/0208; F16H 57/031; F16H 57/039
See application file for complete search history.

(56) References Cited

U.S. PATENT DOCUMENTS

| | | | |
|---|---|---|---|
| 7,034,421 B1 | 4/2006 | Walther | |
| 7,467,565 B2 | 12/2008 | Oberle | |
| 2005/0241420 A1* | 11/2005 | Oberle | F16H 57/021 74/89.42 |
| 2019/0226571 A1* | 7/2019 | Appleyard | B62D 5/0409 |
| 2019/0308498 A1* | 10/2019 | Archer | F16C 19/364 |
| 2019/0366839 A1* | 12/2019 | Huang | B60K 17/145 |
| 2020/0124158 A1* | 4/2020 | Bruhn | F16H 57/031 |

FOREIGN PATENT DOCUMENTS

| | | | |
|---|---|---|---|
| DE | 4116368 A1 | * | 11/1992 |
| DE | 19520886 C1 | * | 2/1996 |
| DE | 19854535 A1 | | 6/2000 |
| DE | 102018100458 A1 | * | 11/2019 |
| EP | 0563410 A1 | | 10/1993 |
| EP | 1546576 B1 | | 11/2006 |

OTHER PUBLICATIONS

Define fluting, Google Search, Jul. 24, 2020 (Year: 2020).*
Polished for reducing friction, Google Search, Jul. 23, 2020 (Year: 2020).*
Injection molded parts, Google Search, Jul. 23, 2020 (Year: 2020).*
EPO Bibliographic data DE4116368 (A1), Juan etal., Nov. 19, 1992. (Year: 1992).*
GGB Bearing Technology: In: GGB Heilbronn GmbH, Heilbronn: GGB DP4 and DP4-B. 2015. 3 Pages, Datumsangabe.—Firmenschrift.

* cited by examiner

COMPENSATING ARRANGEMENT FOR COMPENSATING AXIAL PLAY, AND TRANSMISSION UNIT

CROSS-REFERENCE TO RELATED APPLICATIONS

The present application claims priority of DE 10 2018 126 054.7, filed Oct. 19, 2018, the priority of this application is hereby claimed and this application is incorporated herein by reference.

BACKGROUND OF THE INVENTION

The invention relates to a compensating arrangement for compensating axial play for a transmission housing unit as well as a transmission unit having the compensating arrangement and the transmission housing unit.

A transmission drive unit, in particular for the displacement of movable parts in a motor vehicle, having a transmission housing and a shaft which is mounted therein along a longitudinal axis and which is supported by an axial stop surface on a counter stop surface on said housing, is known e.g. from EP 1 546 576 B1. In order to produce an axial force, at least one of the stop surfaces is inclined at an angle of inclination counter to a plane perpendicular to the longitudinal axis and a component, which interacts with at least one of the stop surfaces, is arranged such that it is displaceable perpendicular to the longitudinal axis. The component is displaceable by means of a pre-stressed elastic element radially to the longitudinal axis, wherein the friction coefficient between the at least one stop surface and the component for a movement to lower the axial force is greater than the tangent of the angle of inclination. As an integral part of the component, the elastic element is configured together with said component to form a bent and punched part.

DE 195 20 886 C1 depicts a worm gear for a seat adjustment device with a gear housing in which a worm is mounted on a shaft. One of the shaft ends is supported on a wedge-shaped insert part, which in turn rests against the inner wall of the gear housing. The insert is made up of several parts and includes a sliding wedge and a supporting part.

SUMMARY OF THE INVENTION

The object of the present invention is to indicate improvements in terms of a transmission unit.

The compensating arrangement serves to compensate an axial play (axial play compensation) for a shaft within an intended transmission housing unit. The invention assumes that the compensating arrangement is designed or set up as intended for a transmission housing unit with specific characteristics. The transmission housing unit accordingly contains a housing base body and a shaft extending along an axial direction, in particular an output shaft. The shaft is mounted such that it is rotatable about the axial direction in the housing base body. The housing base body has a first guide surface which points in the direction opposite to the axial direction and runs transversely to the axial direction. The housing base body has a second guide surface which points in the axial direction and runs obliquely to the axial direction.

"As intended" means that the compensating arrangement is constructively adapted to a specific transmission housing unit or a specific type of transmission housing units and is provided for deployment there; e.g. it is designed for the geometry requirements specified by this, etc.

The first guide surface therefore runs, in particular, perpendicular to the axial direction, the second guide surface is inclined by an angle of inclination (in particular less than 60°, less than 45°, less than 30°) counter to a plane perpendicular to the axial direction.

The shaft is supported with a first end face on the first guide surface. The shaft is supported with a second end face—in the assembly condition—on the second guide surface, with the interposition of the compensating arrangement. The support can be provided in each case directly or with the interposition of further parts, e.g. bearings, sliding surfaces, etc. The shaft is consequently supported or guided or braced between the two guide surfaces. In order to be supported or enclosed between the second end face and the second guide surface, the compensating arrangement has at least two opposite flat sides on its axial outer surfaces. Further flat sides are then "inner" flat sides, as explained in greater detail further below.

The compensating arrangement is configured in the shape of a wedge. In order to compensate the axial play of the shaft, the compensating arrangement or in the event that the latter has multiple parts, at least one part of said arrangement—is displaceable along the second guide surface in a feed direction transversely to the axial direction. Due to the displacement, a distance between the second guide surface and the second end face is enlarged in the manner of a wedge gear (wedge-shaped compensating arrangement and oblique second guide surface) and, as a result, any play is decreased or reduced to zero. In other words, the compensating arrangement forms a wedge system for compensating the play of the shaft in the housing base body.

The transmission housing unit contains a spring element which is pre-stressed in the feed direction, which spring element is arranged between a blunt end (thicker side of the wedge shape) of the compensating arrangement and the housing base body. Pressure is therefore applied by the spring element to the compensating arrangement in order to advance the latter in the feed direction. The compensating arrangement is therefore readjusted or any play between the shaft and the housing base body is reduced.

The compensating arrangement is configured to increase the frictional force at least in the direction opposite the feed direction. "Increasing the frictional force" means that a frictional force must be overcome in order to move the compensating arrangement in the direction opposite the feed direction. Sliding in this direction is therefore made difficult. The "increase" (or analogously also a reduction indicated further below) refers to a condition following the production of the corresponding component, e.g. following injection molding, face milling, facing, etc., i.e. to a base material which has not yet been specifically further processed.

The increasing of the frictional force can be attained e.g. by an external element, e.g. a damper, a latching connection, etc.

The invention is based on the realization that when a wedge system for compensating play is used, the "wedge" or the correspondingly wedge-like arrangement is readjusted by a spring. The wedge must not be displaced during utilization or during the application of larger forces by the spring (e.g. blocking forces).

The invention is based on the idea of achieving a self-retention of the "wedge". The specific idea is to enlarge the necessary force for a backward movement of the "wedge"

and therefore an enlargement in the play by deliberately increasing the friction and, therefore, the displacement force in said direction.

The "wedge" can therefore no longer move back (in the direction towards greater play), but can only be readjusted in the direction towards smaller play, that is to say in order to compensate play. Consequently, a very high stiffness can be achieved in the system.

According to the invention, an extremely high stiffness is produced during a readjusting compensation of axial play.

In a preferred embodiment, the compensating arrangement is configured to increase the frictional force on at least one of its flat sides which point in the axial direction or in the direction opposite the axial direction. These are in particular also "inner" flat sides in the case of multi-part compensating arrangements, e.g. those of the wedge element or the stop element mentioned above. Such multi-part compensating arrangements then have, in addition to the axially outer flat sides, e.g. two (in the case of a two-part compensating arrangement) or four (in the case of a three-part compensating arrangement) further "inner" flat sides within the compensating arrangement, two of which in each case rest on one another in particular.

In an embodiment, the compensating arrangement has a wedge-shaped wedge element resting on the second guide surface and a plane parallel stop element resting on the second end face. The compensating arrangement therefore contains a total of four flat sides, including two internal or inner flat sides which rest on one another. One or both flat sides of the wedge element and/or the flat side of the stop element facing the wedge element is/are configured to increase the frictional force.

As a result of such a division of the compensating arrangement into two elements, these can be optimized in terms of their respective intended purpose. In particular, the friction bearing between the stop element and the shaft can thus be optimized in terms of e.g. low friction, high stability and good lubrication characteristics, etc. The wedge element can, on the other hand, be optimized e.g. in terms of costs, stability, material, etc. The wedge element is therefore clamped between the second guide surface and the stop element. In particular, the wedge element grasps the shaft at least in a U-shaped or arc-shaped manner. Corresponding "inner faces" of the compensating arrangement which are not in contract with the shaft can then be optimized with respect to the frictional force.

In a preferred embodiment, the compensating arrangement is configured to increase the frictional force by means of a structuring of at least one of the flat sides on said flat side. At least a proportion and/or a direction component of the structuring is oriented transversely to the flat side. These are therefore elevations and/or cavities on or in the flat side. This also relates again to all the flat sides, including the aforementioned "inner" flat sides. By means of a structuring, a latching, impressing, snagging, etc. of flat sides in one another can in particular be achieved, which increases the necessary frictional force for displacement in the desired direction in a particularly effective manner. In particular, the aforementioned "self-retention" can therefore be attained by the structuring, in order to consequently guarantee an increased friction at this location. In particular, such a structuring can latch particularly well into plastic. A structuring is therefore preferably present on the stop element, which structuring faces the wedge element and the wedge element is produced from plastic.

The structuring is in particular regular or alternatively also irregular, in particular chaotic, in particular a pattern. The structuring is effected in particular by impressing an embossing die into the flat side. As a result, cavities can be produced; elevations are also created in particular by material extrusion. The structuring can therefore have protrusions and/or cavities in the flat side. The cavities are executed e.g. in the manner of a commercially available golf ball.

In a preferred variant of this embodiment, the structuring is a fluting. The flutes run in particular transversely to the feed direction, in particular also in the shape of a cross, in particular in a grid-like manner, in particular at a right angle to one another, in particular in the direction transversely to and in the direction parallel to the feed direction. In this case as well, the fluting is in particular regular, but can also be irregular.

In a preferred variant of this embodiment, the structuring therefore has at least a proportion which runs transversely to the feed direction. Alternatively or additionally, the fluting is therefore a cross-fluting. Such a structuring is particularly effective with respect to said frictional force increase. The cross-fluting can in particular also have the proportion transversely to the feed direction.

In an embodiment, the flat sides of the stop element are configured differently. Thus, each flat side can be optimized for its intended purpose. In particular, the flat side which faces the shaft is configured to lower the frictional force and the other flat side which faces the wedge element is configured to increase the frictional force.

In a preferred variant of this embodiment, only exactly one of the flat sides of the stop element is configured to increase the frictional force. The other flat side is therefore not modified with respect to its original production condition or is executed to lower the frictional force. In particular, the first-named flat side is provided with the aforementioned structuring and the last-named is executed in a comparatively smooth manner.

In a preferred embodiment of the variant having the wedge element, the latter is a plastic element. This results in the aforementioned advantages of the latching.

In a preferred embodiment, the flat side of the compensating arrangement resting on the second end face is configured to lower the frictional force. This results in a particularly frictionless running of the shaft on the resting compensating arrangement. In particular, the corresponding flat side of the stop element is discussed for relevant embodiments here.

In a preferred embodiment, at least one of the flat sides is configured to lower the frictional force by chromating and/or polishing. To this end, chromating is particularly well suited to this in the given environment.

In a preferred embodiment, an extension is configured on the blunt end of the compensating arrangement, on which extension the spring element is mounted. In particular, the extension can be configured as a spine, on the outer casing surface of which the spring element rests. The extension therefore ensures a defined mounting of the spring element. The ease of assembly is additionally increased, as the extension provides assistance to the fitter during the positioning of the spring element relative to the compensating arrangement.

In a preferred embodiment, a blind bore is configured on the housing base body, in which blind bore the spring element is received at the end. By receiving the spring element in such a bore, a particularly stable mounting of the spring element is possible. For example, a tilting of the spring element is prevented. Therefore, the bore results in a reliable application of the spring pre-stress to the compensating arrangement. In addition, the ease of assembly is further increased, since the bore provides assistance to the fitter during the positioning of the spring element relative to the housing base body.

The object of the invention is also achieved by a transmission unit that contains a compensating arrangement according to the invention and the transmission housing unit, for which the compensating arrangement has been designed as intended. The transmission unit and at least a part of the embodiments thereof as well as the respective advantages have already been explained analogously in connection with the compensating arrangement according to the invention.

In a preferred embodiment, the transmission unit has a shaft projecting through the transmission housing unit, a worm wheel mounted within the transmission housing on the shaft and a worm arranged within the transmission housing, which can be driven with an electric motor and which meshes with the worm wheel. The invention can thus also be used for a worm gear pair.

The invention is also based on the following realizations, observations or considerations and also has the following embodiments. Partly to simplify matters, the embodiments are also indicated as "the invention". The embodiments can also contain parts or combinations of the aforementioned embodiments or correspond to these and/or, if applicable, also include embodiments which have not previously been mentioned.

In practice, it is usual to chromate the wedge (compensating arrangement or wedge element) or to otherwise provide it with a very smooth surface, in order to minimize the friction on the second end face of the shaft, in particular a gear wheel of the shaft having said end face. Said minimal friction is counterproductive for the other side (second guide surface), to which the wedge readjusts. The possibility of pushing back the wedge must be prevented. This can only be achieved to a limited extent with smooth surfaces due to a very high spring force.

The basic idea of the invention is therefore to flute the wedge—preferably in a horizontal direction (or otherwise increase a friction coefficient). This produces a high friction coefficient for the wedge on one side and a very low friction coefficient on the other side. The (in particular plastic) wedge latches and is not pushed back.

An "axial disk having different frictions" is produced according to the invention for the variant of the stop element having differently configured flat sides.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
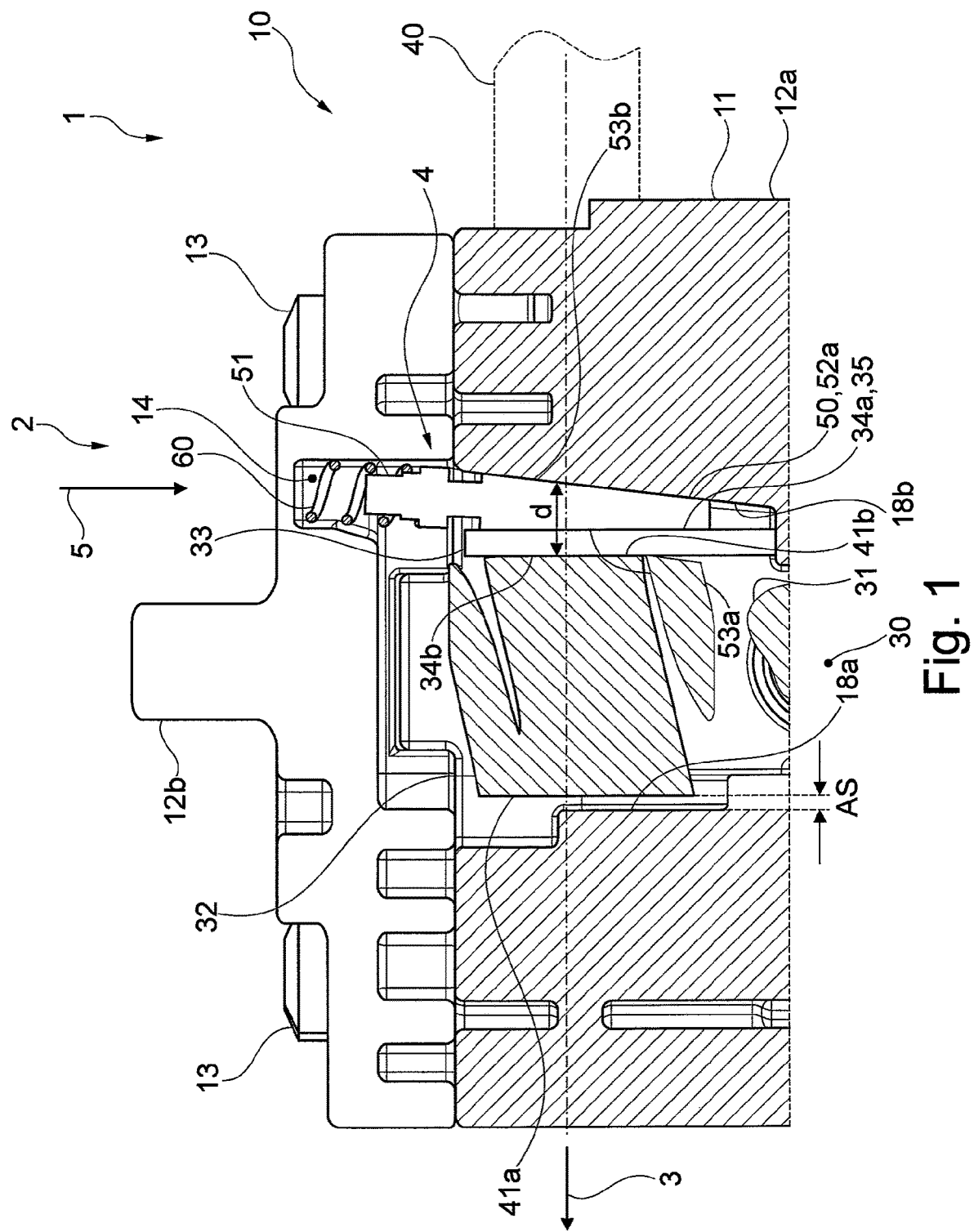
FIG. 1 shows a cross-sectional view of a transmission unit having a transmission housing unit and a compensating arrangement along the line I-I of FIG. 2.
Figure 2:
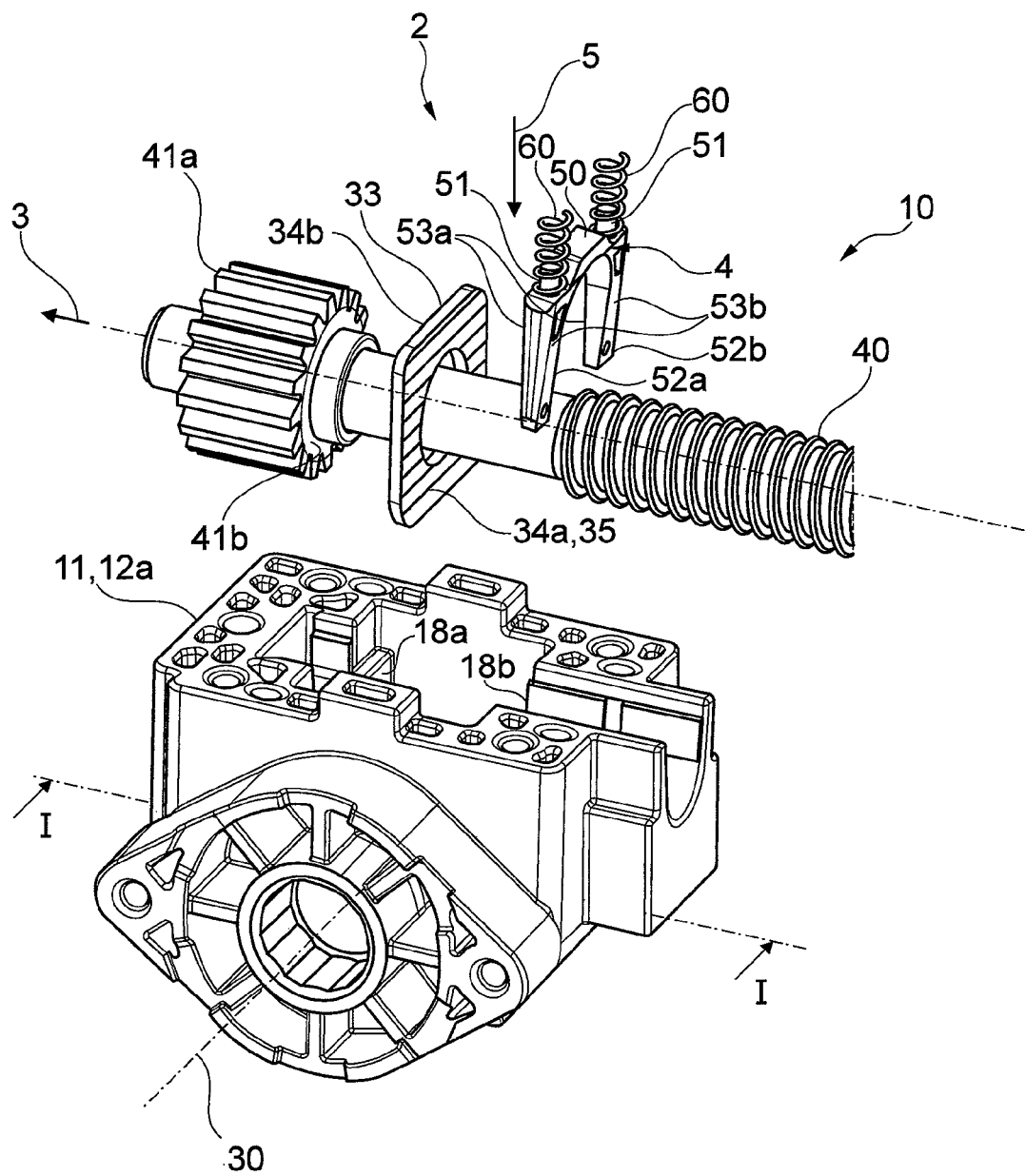
FIG. 2 shows a perspective exploded view of the transmission housing unit having the compensating arrangement from FIG. 1.

The transmission unit 1 represented in FIG. 1 and FIG. 2 substantially consists of a transmission housing unit 10, a drive shaft 30 which is drivable by an electric motor (not represented) and which is also only symbolically indicated by its axial direction, a worm gear (worm 31 and worm wheel 32) mounted within the transmission housing unit 10 and a shaft 40 in the form of an output shaft of the worm gear, which is provided in the transmission housing unit 10.

The shaft 40 is executed as a spindle in the present exemplary embodiment and can in particular be used to displace movable parts in motor vehicles. The shaft 40 further constitutes a shaft within the meaning of the present invention, the axial play AS of which is compensated by an element in the form of a compensating arrangement 2, which is described in greater detail further below. The axis of the drive shaft 30 is offset by 90° with respect to the axis or axial direction 3 of the shaft 40.

The transmission housing unit 10 forms a receptacle chamber for the worm gear by means of a housing base body 11 (base part 12a and housing lid 12b) in its interior.

FIG. 1 shows the section through the transmission housing unit 10 having the shaft 40 thereof and the compensating arrangement 2, omitting the housing lid 12b along the line I-I in FIG. 2.

The base part 12a and the housing lid 12b are connected to one another by means of bolts 13. The worm gear is formed in the present embodiment from a worm 31 which is configured on the drive shaft 30, which meshes with a worm wheel 32. The worm wheel 32 is arranged on the (output) shaft 40 and transfers the movement of the worm 31 to the shaft 40 which is executed as a spindle.

The housing base body 11 has a clearance hole which is adapted to the outer diameter of the shaft 40.

A wedge-shaped wedge element 50 is additionally arranged within the receptacle chamber formed in the housing base body 11. The wedge element 50 serves to compensate the axial play of the shaft 40, in other words to compensate the axial play AS in the axial direction, that is to say the axial direction 3 of the shaft 40 (i.e. in the axial shaft direction), which can be configured between the shaft 40 or the worm wheel 32 and the housing base body 11, e.g. due to size tolerances, assembly inaccuracies or wear. The wedge element 50 grasps the shaft 40 in the form of a U or an arc.

A cylindrical extension 51 is configured at the blunt end 4 of the wedge element 50. A spring element 60 is fitted onto said extension 51 at the end. On the side opposite the extension 51, the spring element 60 is received in a blind bore 14 configured on the housing base body 11.

The wedge element 50 has two legs 52a, b.

During the assembly of the transmission unit 1, the shaft 40 is first introduced into the housing base body 11 or the base part 12a. The wedge element 50 is then located together with the spring elements 60 in the housing base body 11 or base part 12a. The housing lid or lid 12b is then screwed on.

Due to the pre-stressing of the spring element 60, the wedge element 50 is pressed, starting from the situation in FIG. 1 (axial play AS does not equal zero), into an operative position. In the operative position, the wedge element 50 is displaced by the spring element 60 in a feed direction 5, that is to say radially in the direction of the shaft axis or the axial direction 3 of the shaft 40 in such a manner until it is clamped between a second guide surface 18b configured on the housing base body 11 and a thrust washer 33 which is arranged coaxially to the shaft 40 and acts as a stop element of the shaft 40. By advancing in the feed direction 5, a distance d between the second guide surface 18b and the second end face 41b enlarges due to the resulting wedge gear. In the operative position, the wedge element 50 therefore ensures an effective axial play compensation of the shaft 40. The distance d is enlarged until such time as the axial play AS is reduced to zero, by moving the shaft 40 together with the worm wheel 32 towards a first guide surface 18a, until the shaft 40 rests with a first end face 41a (of the worm wheel 32 in this case) on the guide surface 18a.

The wedge element 50 therefore forms the aforementioned compensating arrangement 2 together with the thrust washer 33.

A second end face 41b (of the worm wheel 32 in this case) of the shaft 40 then also rests on the second guide surface 18b, with the interposition of the compensating arrangement 2. More precisely, a second flat side 34b of the thrust washer 33 rests on the second end face 41b. A second flat side 53b of the wedge element 50 rests on the second guide surface 18b and the first flat side 34a of the thrust washer 33 rests on the first flat side 53a of the wedge element 50.

The thrust washer 33 and, as a result, the compensating arrangement 2 are configured by a structuring 35, in this case a fluting, mounted on the first flat side 34a of the thrust washer 33 such that it increases the frictional force. The structuring 35 latches onto the first flat side 53a of the wedge element 50 which is produced from plastic in this case. A sliding back of the wedge element 50 in the direction opposite the feed direction 5 is thus prevented.

Figure 3:
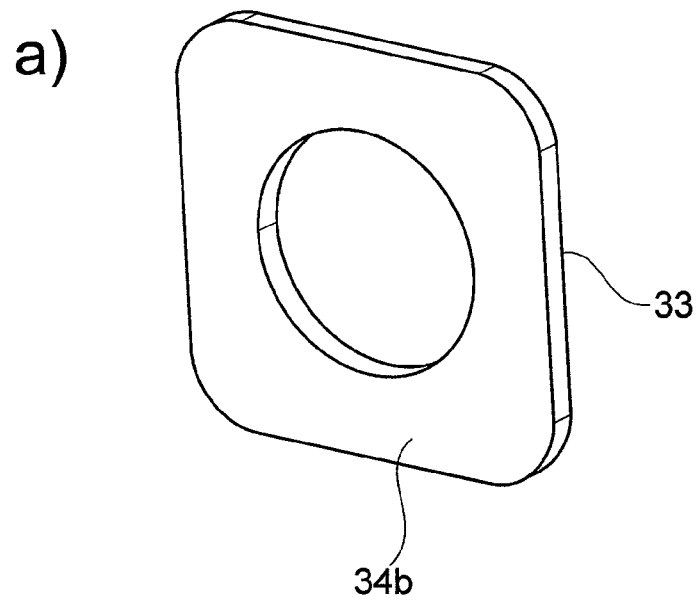
FIG. 3 shows side views of the two flat sides of the stop element from FIGS. 1 and 2.
Figure 3:
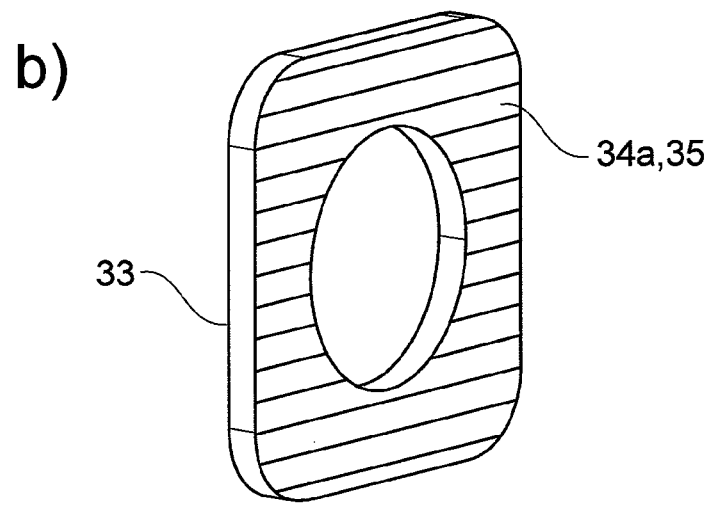

FIG. 3 shows the thrust washer 33 in detail from two viewing directions: FIG. 3a shows the relatively smooth, second flat side 34b. FIG. 3b) shows the first flat side 34a having the structuring 35 in the form of a fluting. The structuring 35 runs transversely, in this case perpendicularly, to the feed direction 5 and is introduced by a plurality of parallel flutes. On the other hand, the flat side 34b is configured to lower the frictional force by chromating.

Figure 4:
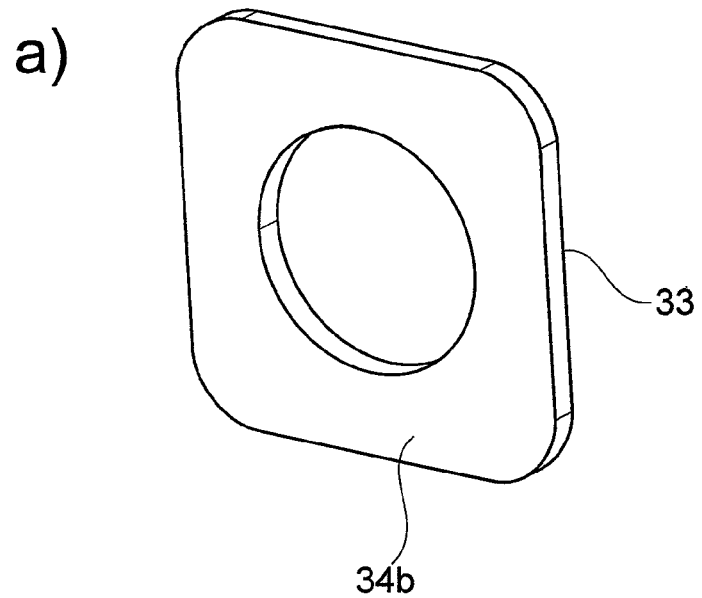
FIG. 4 shows side views of the two flat sides of an alternative stop element.
Figure 4:
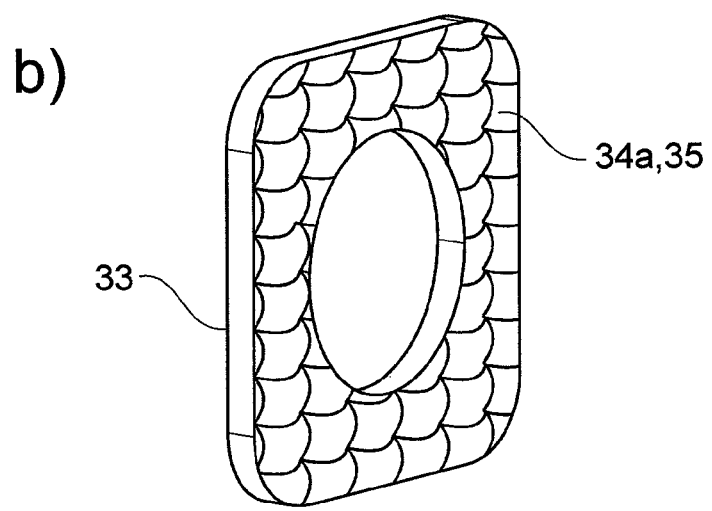

FIG. 4 shows a thrust washer having an alternative structuring 35, here in the form of a cross-fluting. The flutes are introduced by impressing an embossing die. The extruded material forms protrusions which emerge from the surface of the thrust washer transversely or perpendicularly to the surface thereof. The flutes themselves are, on the other hand, introduced into the surface in the form of cavities.

While specific embodiments of the invention have been shown and described in detail to illustrate the inventive principles, it will be understood that the invention may be embodied otherwise without departing from such principles.

We claim:

1. A compensating arrangement for compensating axial play for a transmission housing unit, wherein the transmission housing unit contains a housing base body and a shaft extending along an axial direction, the shaft being mounted rotatably about the axial direction in the housing base body, wherein the housing base body has a first guide surface that points in an opposite direction to the axial direction transversely to the axial direction and has a second guide surface that points in the axial direction and runs obliquely to the axial direction, wherein the shaft is supported with a first end face on the first guide surface and with a second end face on the second guide surface, with interposition of the compensating arrangement which has at least two opposite flat sides, wherein the compensating arrangement is configured to compensate for axial play of the shaft, and is displaceable along the second guide surface in a feed direction transversely to the axial direction, in order to enlarge a distance between the second guide surface and the second end face, wherein the transmission housing unit contains a pre-stressed spring element in the feed direction, which is arranged between a blunt end of the compensating arrangement and the housing base body,
wherein the compensating arrangement is configured to increase frictional force at least in a direction opposite the feed direction,
wherein the compensating arrangement comprises a wedge-shaped wedge element that rests on the second guide surface and a plane parallel stop element that rests on the second end face,
wherein the flat sides of the stop element are configured differently, and
wherein the stop element is an axial disk having different frictions.

2. The compensating arrangement according to claim 1, wherein at least one of the flat sides pointing in or opposite to the axial direction is configured to increase the frictional force.

3. The compensating arrangement according to claim 1, wherein at least one flat side of the wedge element and/or a first flat side of the stop element facing the wedge element is configured to increase the frictional force.

4. The compensating arrangement according to claim 1, wherein at least one of the flat sides has a structuring configured to increase the frictional force, the structuring having at least a proportion and/or a direction component transversely to the corresponding flat side on at least one of the flat sides.

5. The compensating arrangement according to claim 4, wherein the structuring is a fluting.

6. The compensating arrangement according to claim 4, wherein the structuring has at least a portion that runs transversely to the feed direction.

7. The compensating arrangement according to claim 4, wherein the structuring has at least a portion that is a cross-fluting.

8. The compensating arrangement according to claim 1, wherein only exactly one of the flat sides of the stop element is configured to increase the frictional force.

9. The compensating arrangement according to claim 1, wherein the wedge element is a plastic element.

10. The compensating arrangement according to claim 1, wherein the flat side resting on the second end face is configured to lower the frictional force.

11. The compensating arrangement according to claim 1, wherein at least one of the flat sides is chromed and/or polished so as to reduce the frictional force.

12. The compensating arrangement according to claim 1, wherein the compensating arrangement has a blunt end and an extension is configured on the blunt end, the spring element being mounted on the extension.

13. The compensating arrangement according to claim 1, wherein the housing base body has a blind bore in which the spring element is received at an end.

14. A transmission unit, comprising a transmission housing unit; and having a compensating arrangement according to claim 1.

* * * * *